United States Patent
Oishi

(10) Patent No.: US 6,922,312 B2
(45) Date of Patent: Jul. 26, 2005

(54) DISK CARTRIDGE HAVING UPPER SHELL FITTED INSIDE LOWER SHELL TO ENCLOSE LOWER SHUTTER WITH UPPER SHUTTER OUTSIDE UPPER SHELL

(75) Inventor: Kengo Oishi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 128 days.

(21) Appl. No.: 10/298,928

(22) Filed: Nov. 19, 2002

(65) Prior Publication Data

US 2003/0095359 A1 May 22, 2003

(30) Foreign Application Priority Data

Nov. 21, 2001 (JP) ....................................... 2001-355662
Dec. 20, 2001 (JP) ....................................... 2001-387073
Dec. 25, 2001 (JP) ....................................... 2001-391966
Mar. 22, 2002 (JP) ....................................... 2002-080060

(51) Int. Cl.[7] .......................................... G11B 23/033
(52) U.S. Cl. ..................................................... 360/133
(58) Field of Search .......................... 360/133; 369/291; 720/725, 726, 728, 736, 738, 741

(56) References Cited

U.S. PATENT DOCUMENTS

| | | | | |
|---|---|---|---|---|
| 4,471,397 A | * | 9/1984 | Cloutier | 360/133 |
| 4,586,102 A | * | 4/1986 | Bresson | 360/133 |
| 4,652,961 A | * | 3/1987 | Dieffenbach | 360/133 |

FOREIGN PATENT DOCUMENTS

JP      59003756 A   *   1/1984   ........... G11B/23/02

\* cited by examiner

*Primary Examiner*—Craig A. Renner
(74) *Attorney, Agent, or Firm*—Sughrue Mion, PLLC

(57) ABSTRACT

A magnetic disk cartridge comprising a housing in which a magnetic disk is rotatably housed. The housing has upper and lower openings through which magnetic heads provided in a disk drive are positioned over both sides of the magnetic disk. The magnetic disk cartridge further comprises upper and lower shutters for exposing both sides of the magnetic disk through the upper and lower openings. The housing comprises a lower shell, and an upper shell which is fitted inside the lower shell from above. All components are assembled into the magnetic disk cartridge while being stacked within the lower shell.

14 Claims, 14 Drawing Sheets

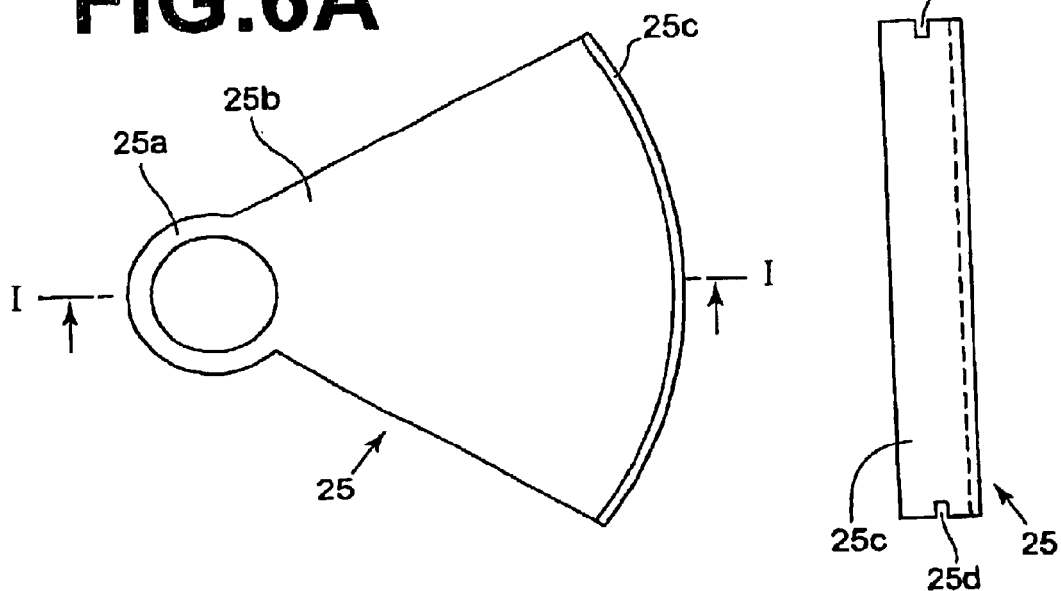
FIG.6A
FIG.6C
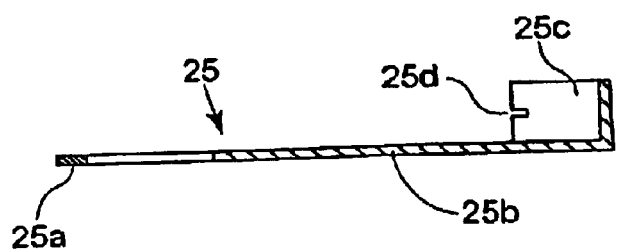
FIG.6B

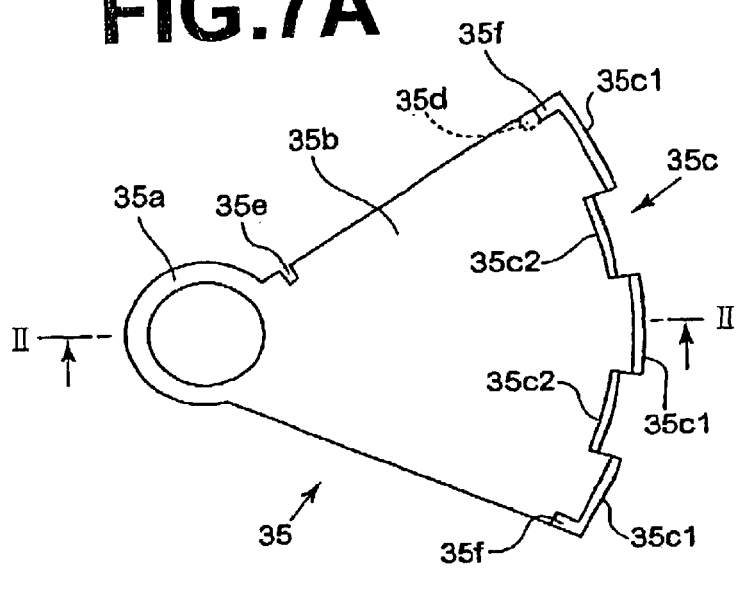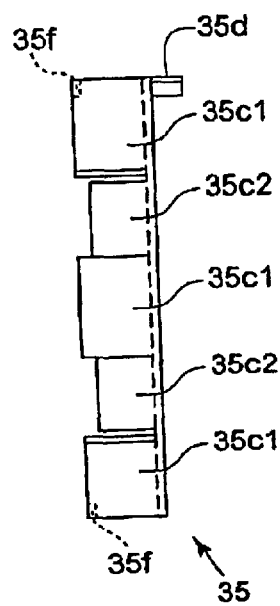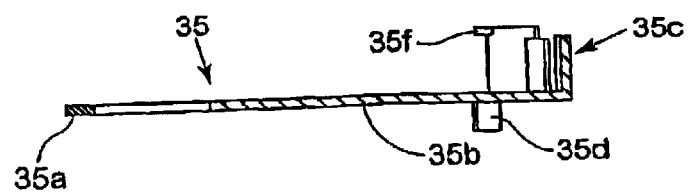

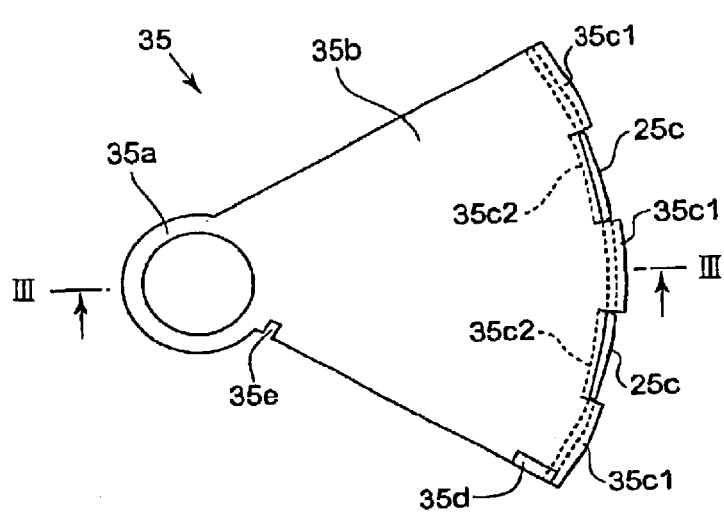
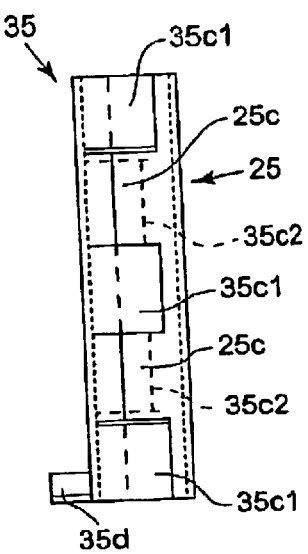
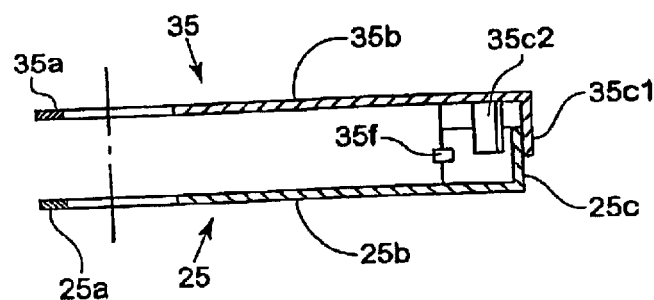

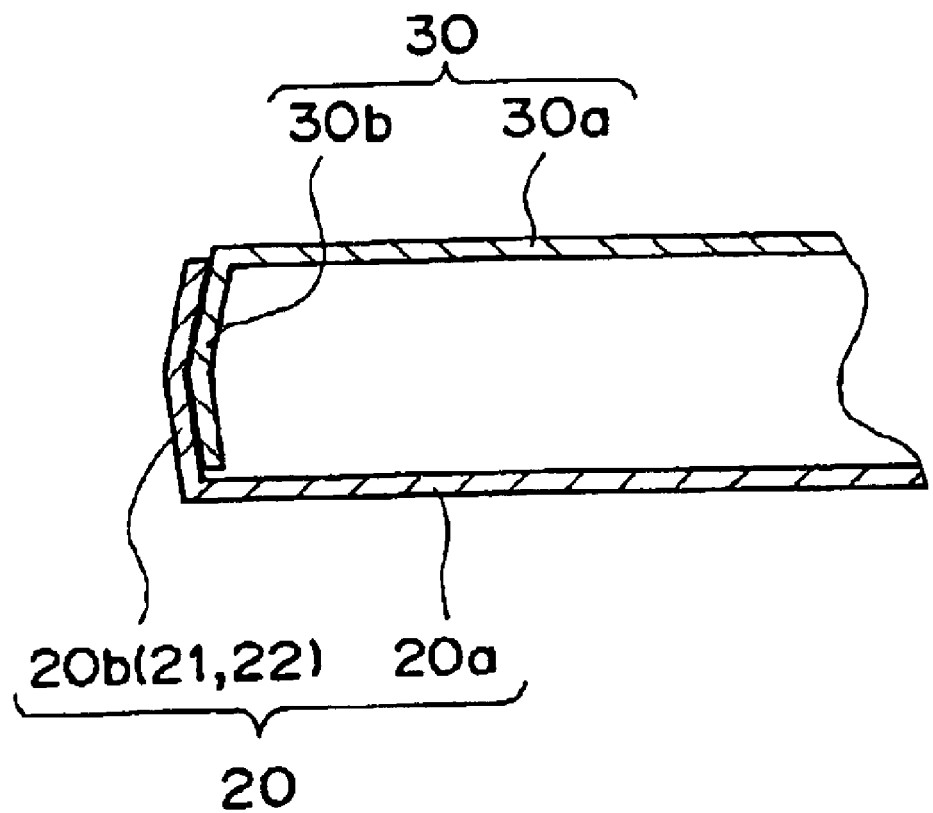

DISK CARTRIDGE HAVING UPPER SHELL FITTED INSIDE LOWER SHELL TO ENCLOSE LOWER SHUTTER WITH UPPER SHUTTER OUTSIDE UPPER SHELL

BACKGROUND OF THE INVENTION

1. Field of the Invention

The present invention relates generally to a magnetic disk cartridge, and more particularly to a small magnetic disk cartridge that is exchangeably loaded in a disk drive provided in a digital still camera, a digital video camera, a laptop personal computer (PC), etc.

2. Description of the Related Art

To record or reproduce information, a recording medium is removably loaded in the card slot of electronic equipment such as a digital still camera, a digital video camera, a laptop PC, etc. Such recording media that have been put to practical use are a semiconductor memory type, a hard disk type, an optical disk type, a magnetic disk type (e.g., a floppy disk type), etc.

Among these recording media, semiconductor memories are most widely used because they are easy to handle and have a relatively large recording capacity. However, they are relatively expensive. Because of this, in digital cameras employing the semiconductor memory, the photographed image data is transferred to a PC and stored, the data is deleted from the memory, and the semiconductor memory is repeatedly used.

There are known hard disks that can store 340 megabytes (MB) of data or 1 gigabyte (GB) of data. However, these hard disks are similarly expensive. Because of this, data is transferred to another device and stored, and hard disks are repeatedly used.

Optical disks have a large recording capacity for their size. For example, an optical disk with a size of 35 mm×41 mm×11 mm can store 260 MB of data. Optical disks with a recording capacity of 512 MB are about to be realized. However, optical disks have the disadvantage that the recording speed is slow, because the writing time is time-consuming.

Some of the magnetic disks (e.g., floppy™ disks) have a small size of 50 mm×55 mm×2 mm. Such a small magnetic disk can be exchangeably loaded in a disk drive of a size that can be inserted into the card slot of a PC, etc. However, the recording capacity is as small as 40 MB and insufficient to record image data photographed by a camera. In addition, the size is not suitable for digital cameras.

With the spread of PCs, digital cameras have spread rapidly in recent years because of the simplicity of recording, enhancement in picture quality due to the development of imagers, possibility of data deletion and transmission, recording capacity size, etc. However, the method of use is restricted, because recording media are limited in cost and recording capacity, as described above. For instance, since recording media are very expensive, a single camera has only a single recording medium, which is repeatedly used. That is, when the recording medium is filled with data, the data is transferred to a PC and deleted. Because of this, there are cases where the recording medium is filled up during a trip. In such a case, the recording medium cannot be stored along with data and cannot be given away to a person.

Hence, there is a demand for realization of a recording medium which is large in recording capacity, low in cost, and small in size so that the data photographed by a digital camera can be stored or given away to a person. In PCs, there is also a demand for realization of a recording medium which is large in recording capacity, low in cost, and small in size so that the medium with stored data can be handed to a person.

To meet the aforementioned demands, it is contemplated that the above-described inexpensive small large-capacity recording medium may comprise a card-type disk drive which is loaded in electronic equipment such as a PC and a digital camera, and a magnetic disk cartridge which is loaded in the small disk drive. That is, it is contemplated that such a magnetic disk cartridge may include a housing in which a flexible magnetic disk capable of high-density recording is rotatably housed, and have a recording capacity of 200 MB or larger. Examples of magnetic recording media with a high recording density are a recording medium with a thin metal film formed by vapor deposition, a recording medium with a thin metal film formed by sputtering, and a recording medium employing barium ferrite powder or metallic powder (for example, ferromagnetic metallic powder). An example of a magnetic recording medium with a high recording density employing barium ferrite powder is disclosed in U.S. application Ser. No. 10/266,584.

The "magnetic recording medium with a high recording density employing barium ferrite powder" is a magnetic disk containing barium ferrite powder in a magnetic layer, and employs a material capable of a high recording density. The magnetic disk may comprise a magnetic recording medium. The magnetic recording medium has a non-magnetic layer which includes both non-magnetic powder and a binder, and a magnetic layer which includes both ferromagnetic powder (which is ferromagnetic metal powder or hexagonal-system ferrite powder) and a binder. The non-magnetic layer and the magnetic layer are formed on at least one surface of a non-magnetic supporting body in the recited order. In the non-magnetic layer, the quantity of carbon black whose average particle diameter is 10 to 30 nm is 10 to 50 weight parts with respect to 100 weight parts of the aforementioned non-magnetic powder. The thickness of the magnetic layer is 0.2 $\mu$m or less. According to a microanalysis by an electron beam, the standard deviation (b) of the strength of an element with respect to an average strength (a) resulting from ferromagnetic powder is $0.03 \leq b/a \leq 0.4$. The center plane average roughness Ra of the magnetic layer is 5 nm or less, and the 10-point average roughness Rz is 40 nm or less. In a magnetic disk employing the above-described material, information is recorded or reproduced by a magnetic head such as an MR head capable of a high recording density.

The above-described magnetic recording medium can have a recording capacity of 200 MB or larger, preferably 500 MB or larger. Therefore, if a still image has 1 MB of data per image, the magnetic recording medium can store 500 images. In the case of a motion picture, the magnetic recording medium can store image contents of about 30 minutes. Thus, the magnetic recording medium can store a motion picture photographed by a digital camera, and a motion picture transmitted by a portable telephone. As a result, users can conveniently use the magnetic recording medium. Furthermore, the magnetic recording medium can be conveniently used in PCs as an inexpensive large-capacity recording medium. Thus, the convenience is great.

Preferred examples of disk drives in the present specification include disk drives incorporated in PCs, digital cameras, etc. In the case of PCs, there are a disk drive 6 shown in FIG. 14A, and disk drives incorporated in a PC card, such as "click!™". The disk drive 6 is connected electrically with a socket 4 of the receiving portion of a card 2 that is inserted in a PC card slot provided in a PC. In the case of a digital camera 3, as shown in FIG. 14B, there is a small disk drive 6 that is connected electrically with the socket of the receiving portion 5 of the camera 3. Therefore, the small disk drive 6 is extremely small in size and has, for example, a length of 38 to 55 mm, a width of 35 to 51 mm, and a thickness of 3 to 5 mm. A magnetic disk cartridge 8 has, for example, a length and a width of 25 to 36 mm and a thickness of 1 to 3 mm.

It has been proposed that the housing of such a subminiature magnetic disk cartridge is formed into the shape of a disk so that the magnetic recording medium can be handled like a coin. That is, if the magnetic recording medium can be handled like a coin that is inserted into the slot of a vending machine, the convenience can be enhanced.

However, such a subminiature magnetic disk cartridge is difficult to assemble because it is subminiature. In addition, such a subminiature magnetic disk cartridge requires a shutter which opens and closes to expose a magnetic disk so that magnetic heads provided in the above-described card type disk drive are positioned over both sides of the magnetic disk. However, since such a magnetic disk cartridge is subminiature, it is fairly difficult to design a shutter which is easy to assemble.

Furthermore, a great number of such magnetic disk cartridges are to be provided on the market. Therefore, it is desired to collect the magnetic disk cartridges after use, in order to perform a recycling process which includes reproducing the collected magnetic disk cartridges by replacing the old magnetic disks with new ones. As a result, there are demands for a reduction in the number of kinds of materials to be used in the magnetic disk cartridge and for easy disassembly of components.

SUMMARY OF THE INVENTION

The present invention has been made in view of the above-described circumstances. Accordingly, it is an object of the present invention to provide a magnetic disk cartridge that is excellent in assembly characteristics. Another object of the invention is to provide a magnetic disk cartridge equipped with shutters which can be easily assembled. Still another object of the invention is to provide a magnetic disk cartridge that utilizes a small number of materials, equipped with a housing which is capable of being easily disassembled.

To achieve the aforementioned objects of the present invention and in accordance with the present invention, there is provided a first magnetic disk cartridge comprising a housing in which a magnetic disk is rotatably housed. The housing has upper and lower openings through which magnetic heads provided in a disk drive are positioned over both sides of the magnetic disk. The first magnetic disk cartridge further comprises upper and lower shutters for exposing both sides of the magnetic disk through the upper and lower openings. The housing comprises a lower shell, and an upper shell which is fitted inside the lower shell from above. All components are assembled into the magnetic disk cartridge while being stacked within the lower shell.

In the first magnetic disk cartridge of the present invention, the aforementioned lower shutter may be disposed inside the lower shell. The aforementioned upper shutter may be disposed outside the upper shell. The upper shutter and lower shutter may be coupled with each other in front of the upper and lower openings and rotatable as an integral unit.

In the first magnetic disk cartridge of the present invention, the aforementioned housing may have an external shape which consists of an arc along the contour of the magnetic disk, and two tangential lines extending from the opposite ends of the arc and crossing each other at right angles.

In the first magnetic disk cartridge of the present invention, the aforementioned housing may further comprise two side walls extending along the two tangential lines and crossing each other at right angles. One of the two side walls may be provided on the rear end of the housing in a direction perpendicular to the direction in which the magnetic disk cartridge is inserted into the disk drive, while the other of the two side walls may be provided parallel to the inserting direction. Preferably, the housing has a corner which is formed by the two side walls. Furthermore, it is preferable that the exterior surfaces of the two side walls protrude slightly outward from tangential lines of a circumferential wall of the housing, and/or the top edges of the two side walls protrude from the upper side of a top plate portion of the housing.

Note that it is preferable that in the present invention, the aforementioned magnetic disk comprise a magnetic recording medium with a high recording density employing barium ferrite powder.

Further in accordance with the present invention, there is provided a second magnetic disk cartridge comprising a housing in which a magnetic disk is rotatably housed. The housing comprises a lower shell, and an upper shell which is fitted inside the lower shell from above. The housing of the second magnetic disk cartridge has upper and lower openings through which magnetic heads provided in a disk drive are positioned over both sides of the magnetic disk. The second magnetic disk cartridge further comprises a shutter for exposing both sides of the magnetic disk through the upper and lower openings. The shutter comprises a lower shutter disposed inside the lower shell and an upper shutter disposed outside the upper shell. The lower shutter and the upper shutter are provided with engagement means so that they are coupled together as an integral unit by press fitting during assembly.

In the second magnetic disk cartridge of the present invention, the lower shutter and the upper shutter may be provided with disengagement prevention means for preventing the shutters from moving in the vertical direction after the shutters are coupled with each other.

In the second magnetic disk cartridge of the present invention, it is preferable that the lower shutter and the upper shutter be equipped with fan-shaped main plate portions for covering the openings and flange portions extending from the arcuate edges of the fan-shaped main plate portions, respectively. It is preferable that the engagement means and the disengagement prevention means are provided in the flange portions.

Further in accordance with the present invention, there is provided a third magnetic disk cartridge comprising a housing in which a magnetic disk is rotatably housed. The housing of the third magnetic disk cartridge has upper and lower openings through which magnetic heads provided in the disk drive are positioned over both sides of the magnetic disk. The third magnetic disk cartridge further comprises upper and lower shutters for exposing both sides of the magnetic disk through the upper and lower openings. The housing comprises an upper metal shell which forms a top surface and a side surface of the housing, and a lower metal shell which forms a bottom surface and a side surface of the housing. The side surface of the upper shell and the side surface of the lower shell are coupled directly with each other.

The expression "the side surface of the upper shell and the side surface of the lower shell are coupled directly with each other" is intended to mean that both are coupled while elastically deforming the upper and lower shells so that the side surface of the upper shell pulls the lower shell inward, and also by generating the reaction force of the elastic deformation so that the side surface of the lower shell pulls the upper shell inward. The elastic deformation may be followed by plastic deformation. Note that the above-described direct coupling includes press fitting, caulking, etc.

According to the first magnetic disk cartridge of the present invention, the aforementioned housing is constructed of a lower shell, and an upper shell which is fitted inside the lower shell from above. In addition, the components of the magnetic disk cartridge are all assembled while being stacked within the lower shell. As a result, the magnetic disk cartridge of the present invention is excellent in assembly characteristics, although it is extremely small in size.

The housing of the disk cartridge has an external shape which consists of an arc along the contour of the magnetic disk, and two tangential lines extending from the opposite ends of the arc and crossing each other at right angles. In such a case, when the housing is inserted into a disk drive, the housing can be reliably positioned in a predetermined direction with respect to the disk drive.

The exterior surfaces of the aforementioned two side walls may protrude slightly outward from the tangential lines of the circumferential wall of the housing, and/or the top edges of the two side walls may protrude from the top surface of the top plate of the housing. In such a case, if only the magnetic disk cartridge is gripped by hand, the top and bottom surfaces of the magnetic disk cartridge can be discriminated and the inserting direction with respect to the disk drive can be easily recognized. In addition, in the case where the shape of the cartridge-inserting slot of the disk drive coincides with the projected shape of the side walls, incorrect insertion of the magnetic disk cartridge can be prevented.

The housing corner defined by the aforementioned two side walls is at a position remote from the circumference of the magnetic disk. As a result, the housing corner can be provided with a positioning reference aperture which penetrates the housing vertically, or an identification piece capable of reading information by the reflection, transmission, or the transmission of a specific wavelength of light can also be buried in the housing after assembly. In that case, a recording capacity and the like can be identified by the identification piece. Therefore, there is the advantage that the housing may be used in common.

According to the second magnetic disk cartridge of the present invention, the aforementioned housing comprises a lower shell, and an upper shell which is fitted inside the lower shell from above. The aforementioned shutter comprises a lower shutter disposed inside the lower shell and an upper shutter disposed outside the upper shell. The lower shutter and the upper shutter are provided with engagement means so that they are coupled together by press fitting. As a result, the upper shutter can be coupled with the lower shutter within the lower shell, after the upper shell is fitted to the lower shell. Thus, it is extremely easy to assemble the shutters onto the housing.

According to the third magnetic disk cartridge of the present invention, the housing comprises an upper metal shell which forms the top and side surfaces of the housing, and a lower metal shell which forms the bottom and side surfaces of the housing. The side surface of the upper shell and the side surface of the lower shell are coupled directly with each other. As a result, the number of kinds of materials used in the housing can be reduced and the housing can be easily disassembled. Therefore, a recycling process, which includes reproducing a magnetic disk cartridge by replacing an old magnetic disk with a new one, can be more easily performed. Thus, resources can be effectively utilized.

Furthermore, the magnetic disk cartridge of the present invention is particularly suitable for use in a digital camera and easy to handle. In addition, the magnetic disk cartridge can be manufactured at a low cost, because it employs a magnetic disk. A magnetic disk cartridge with data recorded thereon can be stored as it is, or it can be given away to a person.

BRIEF DESCRIPTION OF THE DRAWINGS

The present invention will be described in further detail with reference to the accompanying drawings wherein:

FIG. 6A is a top view showing the lower shutter of the magnetic disk cartridge shown in FIG. 2;

FIG. 6B is a sectional view of the lower shutter taken along line I—I in FIG. 6A;

FIG. 6C is a side view of the lower shutter shown in FIG. 6A;

FIG. 7A is a bottom view showing the upper shutter of the magnetic disk cartridge shown in FIG. 2;

FIG. 7B is a sectional view of the lower shutter taken along line II—II in FIG. 7A;

FIG. 7C is a side view of the lower shutter shown in FIG. 7A;

FIG. 8A is a top view of the upper and lower shutters coupled together;

FIG. 8B is a sectional view taken along line III—III in FIG. 8A;

FIG. 8C is a side view of the upper and lower shutters shown in FIG. 8A;

FIG. 9 is a sectional view of the upper and lower shells of the magnetic disk cartridge assembled by a press-fitting method;

DESCRIPTION OF THE PREFERRED EMBODIMENT

Figure 1:
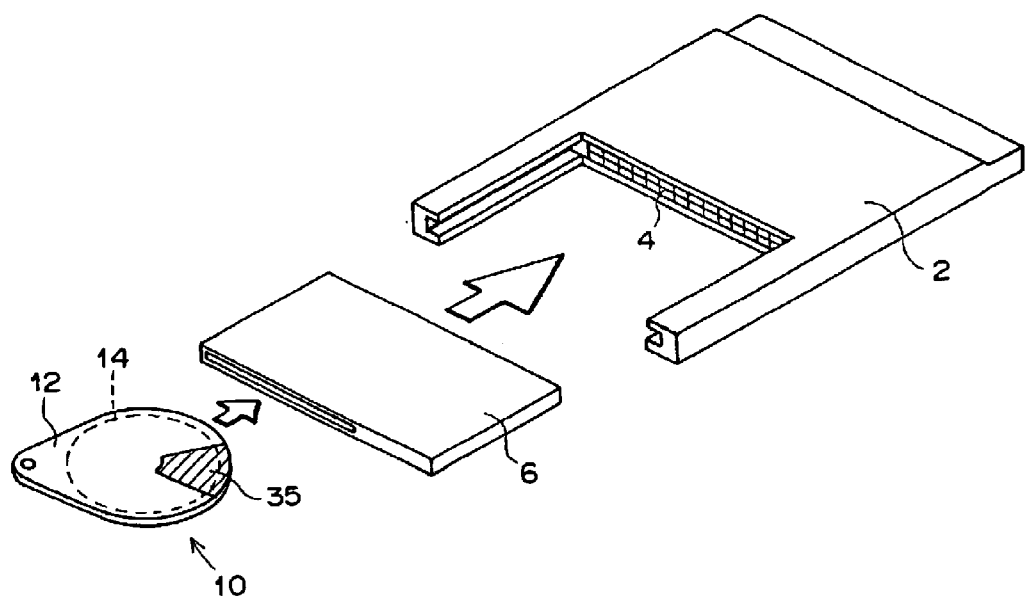
FIG. 1 is a schematic perspective view showing a magnetic disk cartridge constructed in accordance with a preferred embodiment of the present invention, along with a disk drive into which the disk cartridge is inserted and electronic equipment with a card slot into which the disk drive is loaded.
Figure 14A:
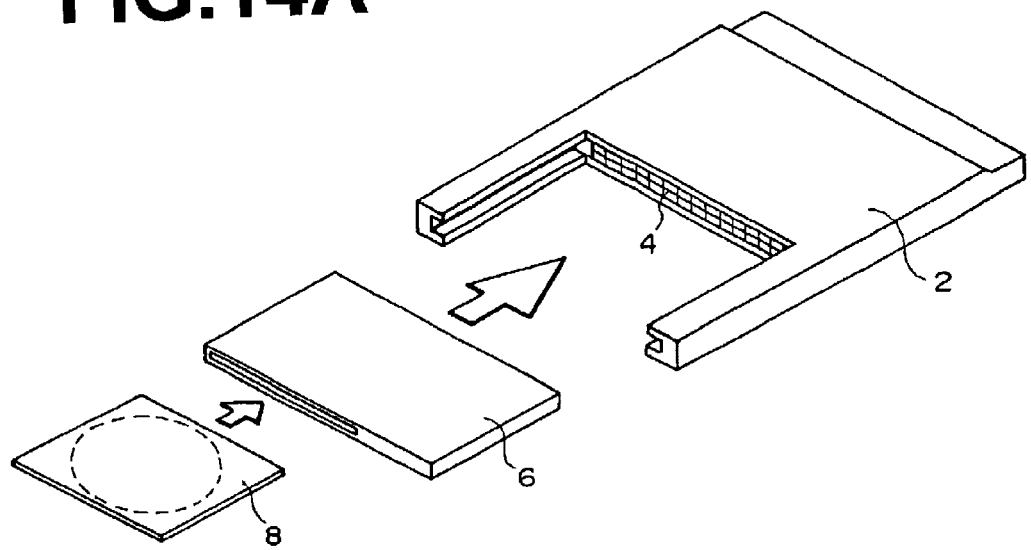
FIG. 14A is a perspective view showing a disk drive on which the present invention is based, and electronic equipment with a card slot in which the disk drive is loaded.
Figure 14B:
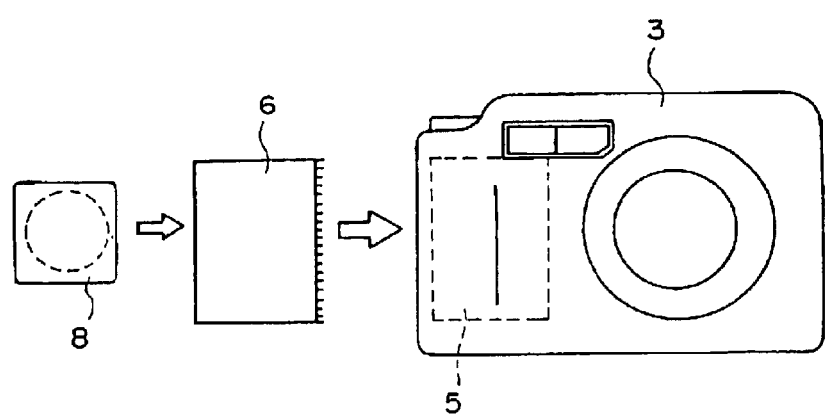
FIG. 14B is a side view showing the magnetic disk cartridge on which the present invention is based, and a disk drive for a digital camera in which the disk cartridge is loaded.

Referring now to FIG. 1, there is shown a magnetic disk cartridge 10 constructed in accordance with a preferred embodiment of the present invention. The magnetic disk cartridge 10 is inserted into a disk drive 6, which is in turn connected electrically with the socket 4 of the receiving portion of a PC card 2 which is inserted into a PC-card slot provided in the same PC as that shown in FIG. 14A. A flexible magnetic disk 14 is rotatably housed within a flat housing 12 of the magnetic disk cartridge 10. Preferably, the magnetic disk 14 is constructed of a magnetic recording medium with a high recording density employing barium ferrite powder. The housing 12 is equipped with a rotatable shutter 35, which opens and closes to expose the magnetic disk 14 so that a magnetic head provided in the disk drive 6 is positioned over the surface of the magnetic disk 14. The housing 12 is also equipped with an upper metal shell 30 and a lower metal shell 20. The upper shell 30 forms the top and side surfaces of the housing 12, while the lower shell 20 forms the bottom and side surfaces of the housing 12. The circumferential wall 30 that is the side surface of the upper shell 30 is coupled directly with the side wall portions 21, 22 and circumferential wall 20b that are the side surfaces of the lower shell 20. The magnetic disk cartridge 10 has an external shape which consists of an arc along the contour of the magnetic disk 14, and two tangential lines extending from the opposite ends of the arc and crossing each other at right angles.

Figure 2:
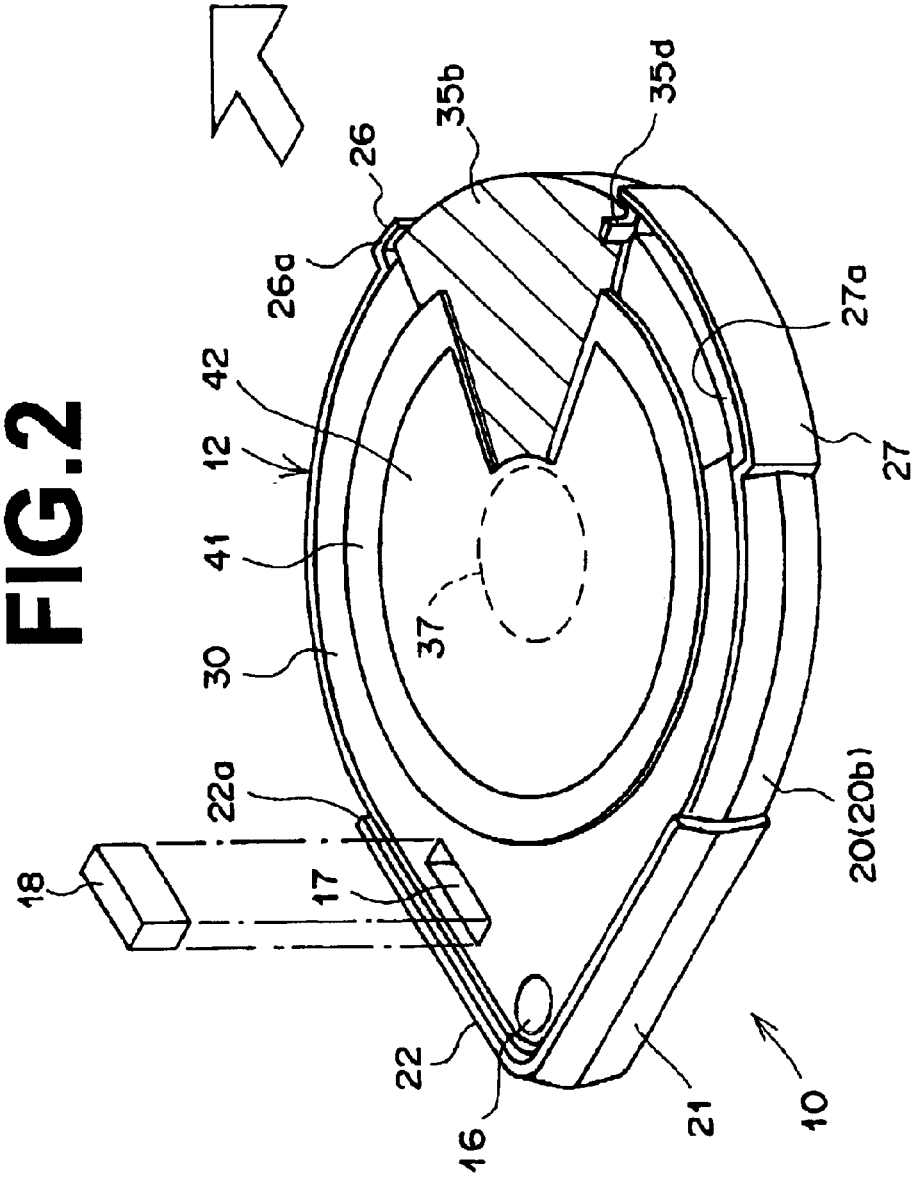
FIG. 2 is a perspective view showing the top surface of the magnetic disk cartridge shown in FIG. 1.
Figure 3:
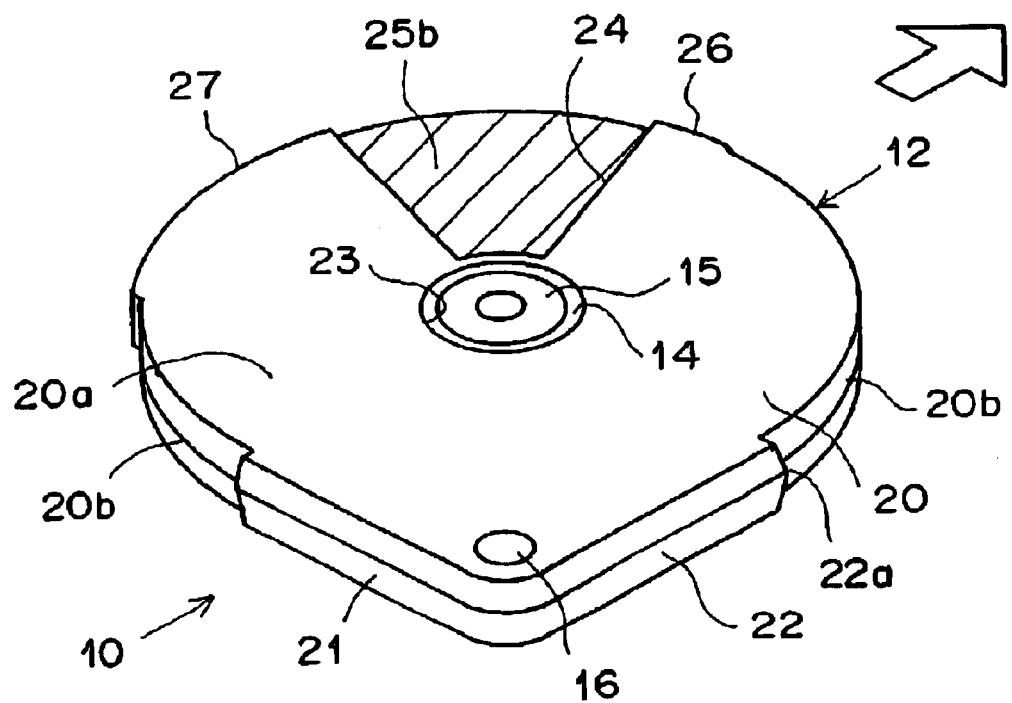
FIG. 3 is a perspective view showing the bottom surface of the magnetic disk cartridge shown in FIG. 1.
Figure 4:
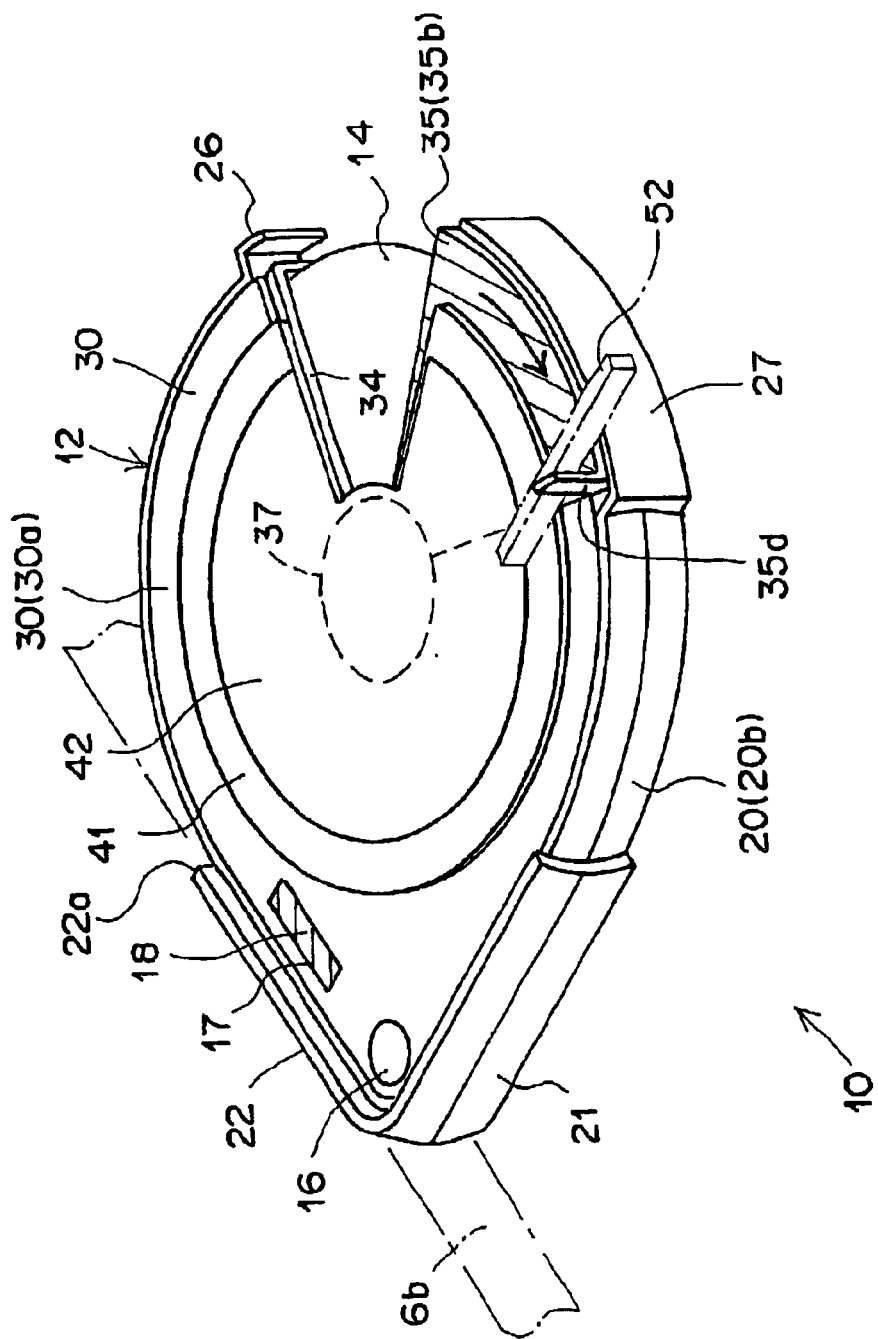
FIG. 4 is a view similar to FIG. 2 showing the opened shutter of the magnetic disk cartridge of FIG. 2.
Figure 5:
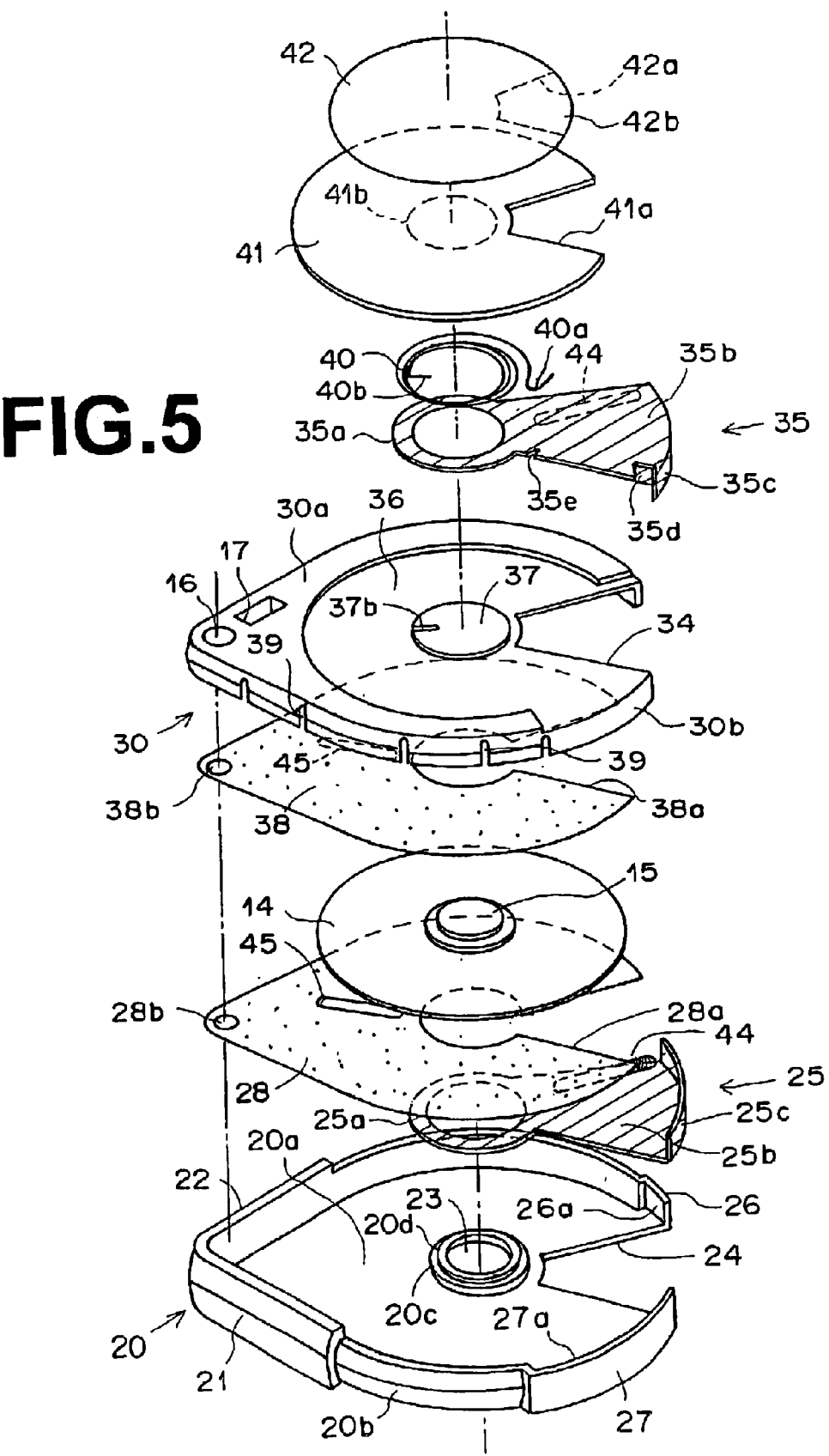
FIG. 5 is an exploded perspective view of the magnetic disk cartridge shown in FIG. 2.

The detailed construction of the magnetic disk cartridge 10 schematically shown in FIG. 1 is shown in FIGS. 2 through 5. FIGS. 2 and 3 show the top and bottom surfaces of the magnetic disk cartridge 10, respectively. FIG. 4 shows the opened shutter, and FIG. 5 shows an exploded perspective view of the magnetic disk cartridge 10 shown in FIG. 2.

In the magnetic disk cartridge 10, the housing 12 is constructed of the lower metal shell 20 and the upper metal shell 30, as described above. The upper shell 30 is press-fitted inside the lower shell 20 from above. As shown in FIG. 5, the lower metal shutter 25 is disposed inside the lower shell 20. The upper metal shutter 35 is disposed outside the upper shell 30. The components of the magnetic disk cartridge 10 are all stacked within the lower shell 20.

As evident in FIG. 5, the lower shell 20 is equipped with a bottom plate 20a forming the bottom surface of the housing 12, and side walls forming the side surfaces of the housing 12 rising upward from the circumferential edge of the bottom plate 20a except at a lower opening 24 described later. Among the side walls, side walls 21, 22 rise from the right-angled corner formed by the above-described 2 tangential lines. The top edges of the side walls 21, 22 protrude from the top surface of the upper shell 30 in the direction perpendicular to the top surface. The opposite ends of the side walls 21, 22 project slightly outward from the circumferential wall 20b of the housing 12 to form incorrect-insertion preventing walls. The first side wall 21 is formed in the rear end of the housing 12 in a direction perpendicular to the direction in which the magnetic disk cartridge 10 is inserted into the disk drive 6, while the second side wall 22 is formed parallel to the inserting direction. The front end of the second side wall 22 in the cartridge inserting direction is formed into an insertion positioning step portion 22a so that the housing 12 is held correctly with respect to the disk drive 6. The right-angled corner of the housing 12 defined by the sidewalls 21, 22 has a aperture 16, which penetrates the upper and lower shells 30, 20 in a direction substantially parallel to the axis of rotation of the magnetic disk 14. The aperture 16 in the lower shell 20 is used as a positioning reference aperture.

The central portion of the magnetic disk 14 is fixed to a center core 15. The bottom surface of the center core 15 is exposed to the outside through a center aperture 23 formed in the central portion of the bottom plate 20a of the lower shell 20. Around the center aperture 23, there is formed an annular wall 20c coaxially with the center aperture 23. The annular wall 20c rotatably supports the annular portion 25a of the lower shutter 25 described later. The annular wall 20c has a flat upper surface on which an annular wall 20d of a smaller diameter is formed coaxially with the large annular wall 20c. The annular wall 20d supports the center portion of a lower slide sheet 28 to be described later. The annular walls 20c and 20d can be formed by performing a drawing operation on the bottom plate 20a. Around the positioning reference aperture 16 formed in the right-angled corner of the bottom plate 20a of the lower shell 20, there is formed an annular wall (not shown) by drawing.

The lower shell 20 has a fan-shaped lower opening 24 through which a magnetic head provided in the disk drive 6 is positioned over the under side (surface) of the magnetic disk 14, on the side opposite to the positioning reference aperture 16 with respect to the center aperture 23. The lower opening 24 is formed over a predetermined angular range with respect to the center aperture 23. The lower shutter 25 opens and closes to expose the magnetic disk 14 through the lower opening 24 and is disposed inside the lower shell 20.

As shown in FIGS. 6A to 6C, the lower shutter 25 is formed from a metal plate and has a center annular portion 25a, a fan-shaped main plate portion 25b extending radially from the center annular portion 25a over a greater angular range than the fan-shaped lower opening 24, and a flange portion 25c extending upward from the arcuate edge of the fan-shaped main plate portion 25b. The center annular portion 25a is rotatably supported on the annular wall 20c of the lower shell 20. The opposite edges of the flange portion 25c are provided with cutouts 25d, 25d into which the engagement tongue pieces 35f, 35f of the opposite edges of the flange portion 35c of the upper shutter 35 are fitted.

The upper shell 30 is likewise formed from a metal plate and has a top plate 30a and a doglegged circumferential wall 30b. The top plate 30a is approximately similar in shape to and slightly smaller than the bottom plate 20a of the lower shell 20. The doglegged circumferential wall 30b extends downward from the circumferential edge of the top plate 30a except at the portion of an upper opening 34. The outer surface of the doglegged circumferential wall 30b engages directly with the inner surfaces of the doglegged circumferential wall 20b and doglegged side walls 21, 22. The upper opening 34 of the upper shell 30 is aligned vertically with the lower opening 24 of the lower shell 24. The upper shutter 35, which opens and closes to expose the magnetic disk 14 through the upper opening 34 so that a magnetic head provided in the disk drive 6 can be positioned over the upper side (surface) of the magnetic disk 14, is provided on the top surface 30a of the upper shell 30.

In proximity to a aperture 16 vertically aligned with the positioning reference aperture 16 of the lower shell 20, the right-angled corner of the upper shell 30 has a rectangular hole 17 in which an identification piece 18 capable of reading information by the reflection, transmission, or the transmission of a specific wavelength of light can be buried. Around the aperture 16, there is formed an annular wall (not shown) in the under side (bottom surface) of the upper shell 30 by drawing.

As shown in FIGS. 7A to 7C, the upper shutter 35 is formed from a metal plate similar in shape to the lower shutter 25. The upper shutter 35 has a center annular portion 35a, a fan-shaped main plate portion 35b extending radially from the center annular portion 35a, and a flange portion 35c extending downward from the arcuate edge of the main plate portion 35b. The downward flange portion 35c has an odd number of engagement pieces (in the preferred embodiment, 5 (five) engagement pieces) for the purpose of engaging with the upward flange portion 25c of the lower flange 25c of the lower shutter 25. The distances of the 5 engagement pieces from the axis of rotation vary so that the center and two outermost engagement pieces 35c1 can engage elastically with the outside surface of the upward flange portion 25d of the lower shutter 25 and the two intermediate engagement pieces 35c2 can engage elastically with the inside surface of the upward flange portion 25d.

The upper shutter 35 has a shutter projection 35d which extends upward from the fan-shaped plate portion 35b, for the purpose of opening the shutters 25, 35. The top edge of the shutter projection 35d is formed so that it is approximately the same in height as the top edges of the corner walls 21, 22.

The proximal portion of the main plate portion 35b of the upper shutter 35 is provided with a cutout 35e to which the outer end 40a of a shutter urging spring 40 is fixed. The opposite edges of the flange portion 35c of the upper shutter 35 have engagement tongue pieces 35f, 35f that project toward the axis of rotation. The engagement tongue pieces 35f, 35f are fitted in the cutouts 25d, 25d of the opposite ends of the flange portion 25d of the lower shutter 25.

The above-described lower shutter 25 and upper shutter 35 are coupled as shown in FIGS. 8A to 8C. In the coupled state, the flange 25c of the lower shutter 25 is press-fitted in the space between the engagement pieces 35c1 and 35c2 of the flange portion 35c of the upper shutter 35, and at the same time, the engagement tongue pieces 35f, 35f of the flange portion 35c of the upper shutter 35 are fitted in the cutouts 25d, 25d of the lower shutter 25.

On the opposite sides of the fan-shaped opening 24 of the lower shell 20, there are formed circumferential walls 26, 27 so that the flange portions 25c and 35c coupled as described above are rotatably housed. The circumferential walls 26, 27 protrude radially outward over the range in which the shutters 25,35 rotate. Inside the circumferential walls 26, 27, there are formed arcuate recesses 26a, 27a, as shown in FIG. 2.

The upper side of the top plate 30a of the upper shell 30 is provided with a recess 36 (see FIG. 5) in which the annular portion 35a and main plate portion 35b of the shutter 35 are rotatably housed. The central portion of the recess 36 is formed into a circular protrusion 37 on which the annular portion 35a of the shutter 35 is rotatably supported. When the annular portion 35a of the shutter 35 is rotatably supported on the circular protrusion 37, the main plate portion 35b of the shutter 35b contacts the recess 36 and the downward flange 35c is disposed outside the arcuate circumferential walls 30b on the opposite sides of the opening 34 of the upper shell 30.

The upward flange portion 25c of the lower shutter 25 is coupled with the downward flange portion 35c of the upper shutter 35, as shown in FIG. 8. That is, after the upper shell 30 is fitted to the lower shell 20, the upper shutter 35 is placed on the upper shell 30. By applying force from above after positioning, the upward flange portion 25c of the lower shutter is press-fitted in the space between the engagement pieces 35c1 and 35c2 of the downward flange portion 35c of the upper shutter 35. At this time, the opposite engagement pieces 35c1 and 35c2 of the downward flange portion 35c of the upper shutter 35 are elastically bent, so that the engagement tongue pieces 35f, 35f are fitted into the cutouts 25d, 25d of the lower shutter 25.

As described above, the magnetic disk cartridge 10 is characterized in that the components are all assembled while being stacked on the lower shell 20. A method of assembling the magnetic disk cartridge 10, along with components other than the above-described components, will be described with reference to FIGS. 5 and 9.

Initially, the annular portion 25a of the lower shutter 25 is fitted on the annular wall 20c of the bottom plate 20a of the lower shell 20. In this case, when the upward flange 25c of the lower shutter 25 is disposed to contact the recesses 26a and 27a on the opposite sides of the lower opening 24, the main plate portion 25b of the lower shutter 25 is disposed at the position where the lower opening 24 is covered. Then, a lower slide sheet 28 is disposed. The lower slide sheet 28 is approximately similar in shape to the bottom plate 20a of the lower shell 20. Therefore, the lower slide sheet 28 has a center aperture, a fan-shaped opening 28a extending outwardly from the center aperture, and a right-angled corner defined by two straight lines crossing each other at right angles. The center aperture of the slide sheet 28 is fitted on the inner annular wall 20d of the bottom plate 20a of the lower shell 20 and supported by the flat surface of the outer annular wall 20c. The right-angled corner of the slide sheet 28 is provided with a aperture 28b, which is aligned vertically with the positioning reference aperture 16 of the bottom plate 20a of the lower shell 20. The aperture 28b of the slide sheet 28 is fitted on an annular wall (not shown) formed outside the positioning reference aperture 16 of the lower shell 20. In this way, the right-angled corner of the slide sheet 28 is supported.

Next, the magnetic disk 15 with the center core 15 is disposed. Furthermore, an upper slide 38, which is similar in shape to the lower slide 28 and has an opening 38a and a corner aperture 38b, is disposed. Thereafter, the doglegged circumferential wall 30b of the upper shell 30 is fitted directly to the inner surfaces of the doglegged circumferential wall 20 and side walls 21, 22 of the lower shell 20. In this way, the upward flange portion 25c of the lower shutter 25, which is in the recesses 26a and 27a, becomes movable within and along a groove, which is formed by the recesses 26a, 27a of the lower shell 20 and the circumferential wall 30b of the upper shell 30. In addition, the annular wall of the aperture 16 of the corner of the top plate 30a of the upper shell 30 is fitted in the aperture 38b of the corner of the upper slide sheet 38. As a result, the corner of the upper sheet 38 is supported and the corners of the upper and lower sheets 38, 28 are also supported by the inner wall surfaces of the side walls of the corner of the upper shell 30.

Next, the upper shutter 35 is placed so that the annular portion 35a thereof is supported on the circular protrusion 37 of the upper shell 30. As shown in FIG. 8, the upward flange 25c of the lower shutter 25 is press-fitted in the space between the engagement pieces 35c1 and 35c2 of the downward flange 35c of the upper shutter 35. At the same time, the engagement tongue pieces 35f of the opposite ends of the downward flange portion 35c of the upper shutter 35 are fitted in the cutouts 25d of the lower shutter 25. Next, the shutter urging spring 40 is fitted on the circular protrusion 37. The inner end 40b of the spring 40 is fixed to the slit 37b of the circular protrusion 37, while the outer end 40a is fixed to the cutout 35e of the main plate portion 35b of the upper shutter 35. In this way, the upper and lower shutters 35, 25 are urged in the closing direction and held in the closing position.

Next, a metal cover plate 41, which has an opening 41a similar to the opening 34 of the upper shell 30 and is larger in diameter than the recess 36 of the upper shell 30, is bonded on the circular protrusion 37 of the upper shell 30 through the center portion shown by a broken line 41b in FIG. 5. The circumferential portion of the cover plate 41 is also bonded on the top plate 30a of the upper shell 30 to prevent the spiral spring 40 from being disengaged and to form space so that the shutter 35 can rotate under the cover plate 41. In this way, assembly of the disk cartridge 10 is completed.

If the upper side (surface) of the cover plate 41 is roughened, the top and bottom surfaces of the disk cartridge 10 can be discriminated by the sense of touch. Alternatively, fluorescent paint may be applied to the upper side of the cover plate 41 so that the top and bottom surfaces of the disk cartridge 10 can be discriminated even in the dark. The upper side of the cover plate 41 may also be matted so that numerals, etc., can be written with a pencil. Furthermore, as illustrated, a circular paper label 42 may be attached on the upper side of the cover plate 41 so that information can be written on the label 42. In this case, if the label 42 has a perforation 42a along the contour of the opening 41a of the cover plate 41, and an area 42b within the perforation 42a is removed when the cartridge 10 is used, it can be guaranteed that a new cartridge 10 has not been used. In addition, the exposed upper shutter 35 can be protected.

Since the circumferential wall 30b of the upper shell 30 is fitted elastically to the circumferential wall 20b of the lower shell 20, it is preferable to provide a plurality of slits in either the circumferential wall 30b or the circumferential wall 20b to obtain elasticity. For instance, the circumferential wall 30b may be provided with a plurality of slits 39, as shown in FIG. 5. The upper side of the main plate portions 25b of the lower shutter 25 is provided with a lower cleaning member 44, which contacts the under side of the magnetic disk 14 through the opening 28a of the lower slide member 28. Similarly, the under side (surface) of the main plate 35b of the upper shutter 35 is provided with an upper cleaning member 44, which contacts the upper side of the magnetic disk 14 through the opening 34 of the upper shell 30 and the opening 38a of the upper slide sheet 38. The cleaning members 44 are mounted on the end portions of the main plate portions 25b, 35b of the shutters 25, 35 in the closing direction, respectively. These cleaning members 44 also have the function of preventing the magnetic disk 14 from contacting the main plate portions 25b, 35b of the shutters 25, 35 when the magnetic disk 14 is stationary.

If the shutters 25, 35 are opened and the cleaning members 44 contact only a portion of each side of the magnetic disk 14 being rotated, the magnetic disk 14 will not be balanced during rotation. Therefore, it is preferable to provide projections 45 of the same height as the cleaning members 44 on the surfaces of the slide sheets 28, 38 that contact the magnetic disk 14, at positions shifted 180 degrees from the cleaning members 44 when the shutters 25, 35 are opened. Furthermore, two additional radial projections 45 may be provided on each of the slide sheets at positions shifted 120 degrees from the cleaning member 44 when the shutters 25, 35 are opened.

Figure 10:
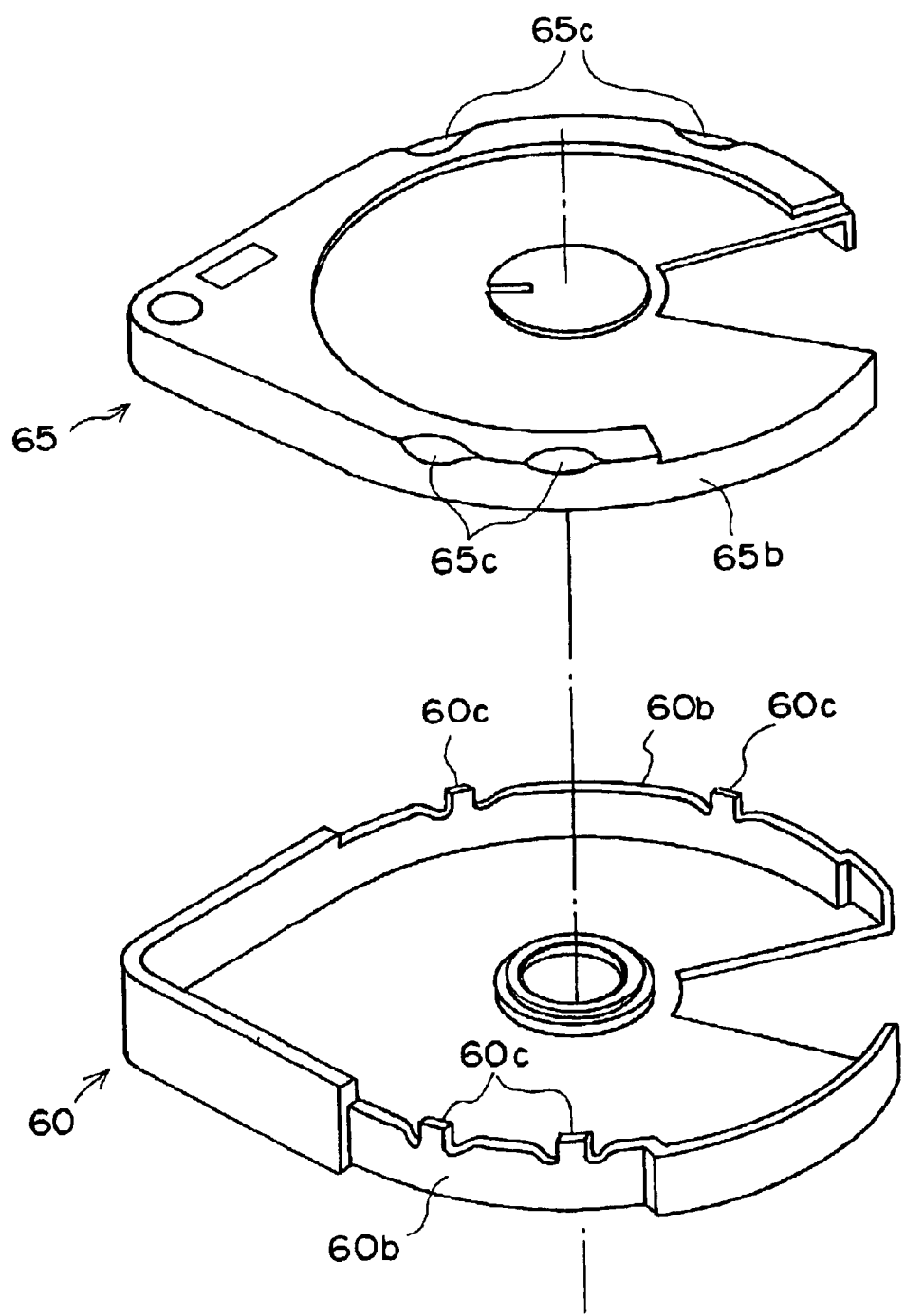
FIG. 10 is an exploded perspective view showing how the upper and lower shells of a magnetic disk cartridge are assembled by a fitting method.
Figure 11:
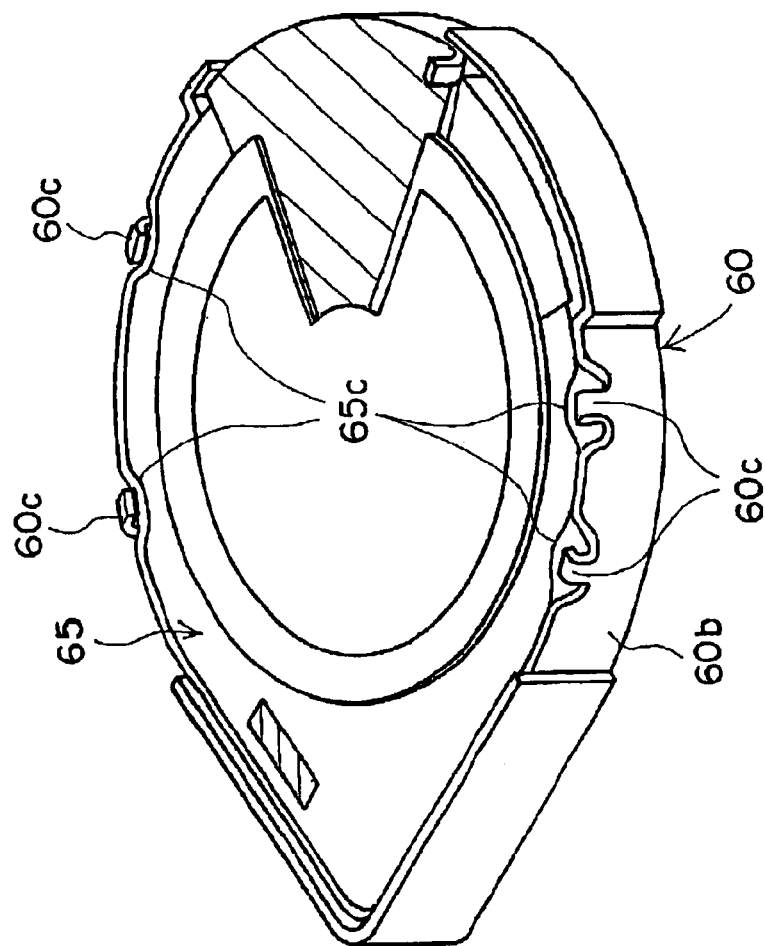
FIG. 11 is a perspective view of the magnetic disk cartridge assembled by the fitting method.

Next, a description will be given of the case where the upper and lower shells of a magnetic disk cartridge are coupled together by a fitting method that differs from the above-described press-fitting method. FIG. 10 shows how the upper and lower shells of a magnetic disk cartridge are assembled by a fitting method. The magnetic disk cartridge assembled by the fitting method is shown in FIG. 11.

As shown in FIG. 10, the circumferential wall 60b of a lower shell 60 is provided with projecting portions 60c for caulking. On the other hand, the circumferential wall 65b of an upper shell 65 is provided with receiving holes 65c at the positions that correspond to the projecting portions 60c when the lower shell 60 and the upper shell 65 are combined together. After the lower shell 60 with the projecting portions 60c is combined with the upper shell 65 having the receiving holes 65c, the projecting portions 60c are caulked toward the receiving holes 65c, as shown in FIG. 11. The lower shell 60 is coupled directly with the upper shell 65. In this manner, the above-described magnetic disk cartridge may be assembled.

Figure 12:
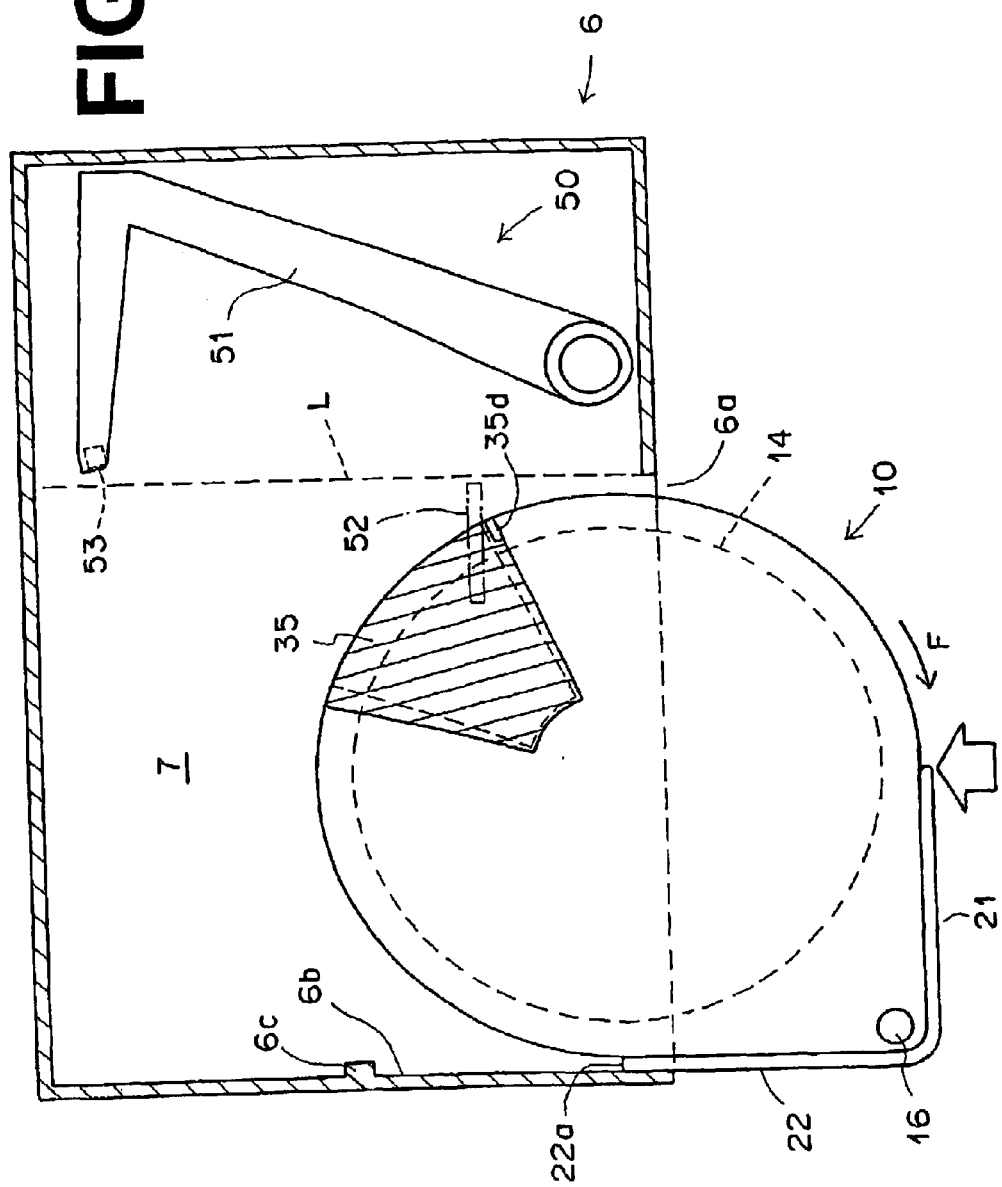
FIG. 12 is a schematic plan view showing how the magnetic disk cartridge of the present invention is inserted into a disk drive.
Figure 13:
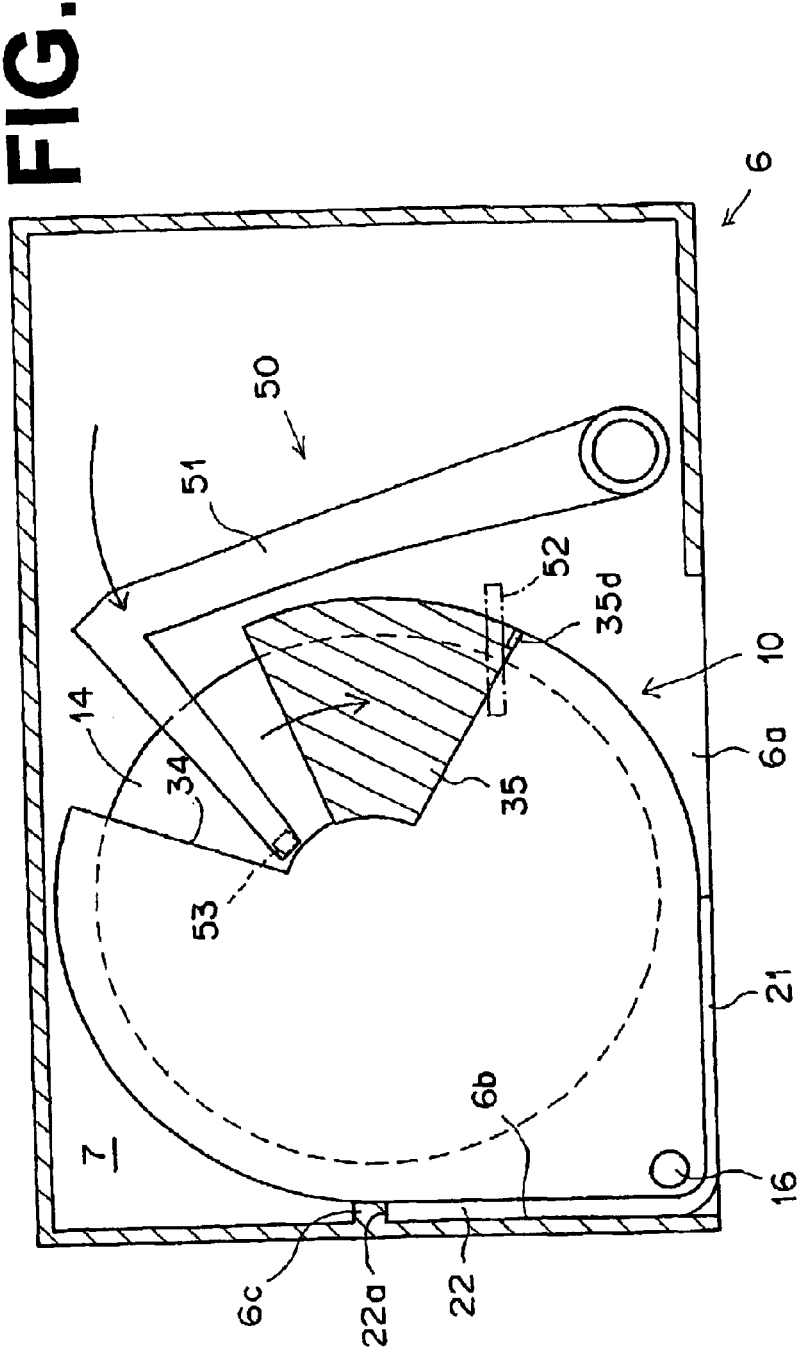
FIG. 13 is a schematic plan view of the magnetic disk cartridge inserted into the disk drive.

FIG. 12 shows how the magnetic disk cartridge 10 is inserted into the disk drive 6. The magnetic disk cartridge 10 inserted into the disk drive 6 is shown in FIG. 13. Since FIGS. 12 and 13 are used for the purpose of explaining the relative position between the magnetic disk cartridge 10 and the disk drive 6, details are omitted.

The disk drive 6 is equipped with a cartridge-inserting slot 6a and an inner cartridge-housing space 7. The disk drive 6 is further equipped with a magnetic-head assembly 50 and a shutter-opening member 52. The magnetic-head assembly 50 is equipped with a pair of upper and lower rotatable arms 51, which are disposed outside a passage (whose edge is indicated by a broken line L) into which the cartridge 10 is inserted. The shutter-opening member 52 engages the shutter projection 35d of the shutter 35 and opens the shutters 25, 35. The distal ends of the upper and lower arms 51 are provided with magnetic heads 53 oriented to face each other, respectively. When the upper and lower arms 51 are moved over the magnetic disk 14, the magnetic heads 53 are disposed over both sides of the magnetic disk 14.

The cartridge-inserting slot 6a is formed in contact with a sidewall surface 6b remote from the magnetic-head assembly 50 of the disk drive 6. The side wall surface 6b is provided with a positioning protrusion 6c, which is engaged by the insertion positioning step portion 22a of the side wall 22 of the magnetic disk cartridge 10. Although not shown, the upper edge of the cartridge-inserting slot 6a is provided with cutouts into which the top edge of the side wall 22 of the magnetic disk cartridge 10 and the shutter projection 35d are inserted. In this way, incorrect insertion of the magnetic disk cartridge 10 is prevented.

When the magnetic disk cartridge 10 is inserted into the disk drive in the direction indicated by an arrow in FIG. 12, the shutter projection 35d of the shutter 35 is engaged by the shutter-opening member 52 of the disk drive 6. In this state of engagement, the shutters 25, 35 are opened with the insertion of the magnetic disk cartridge 10. In that case, since the shutter projection 35d of the shutter 35 is provided on the right side with respect to the direction in which the magnetic disk cartridge 10 is inserted, force F is applied from the shutter-opening member 52 to the magnetic disk cartridge 10 in the clockwise direction when the magnetic disk cartridge 10 is inserted. However, the side wall 22 of the right-angled corner of the housing 12 is brought into contact with the inner wall surface 6b of the disk drive 6, so rotation of the magnetic disk cartridge 10 in the clockwise direction is prevented. If the magnetic disk cartridge 10 is completely inserted within the disk drive 6, as shown in FIG. 13, the positioning projection (not shown) of the disk drive 6 is fitted in the positioning reference aperture 16, and as occasion demands, the positioning protrusion (not shown) of the disk drive 6 is fitted in the positioning recess 22b of the side wall 22 of the housing 12. In this way, the magnetic disk cartridge 10 is held in a predetermined position within the disk drive 6. Thereafter, the upper and lower arms 51 of the magnetic-head assembly 50 are rotated in the counterclockwise direction so that the magnetic heads 53 are positioned over the data tracks on both sides of the magnetic disk 14.

As set forth above, the magnetic disk cartridge 10 of the present invention has the following advantages:

(1) The housing 2 is constructed of the lower shell 20, and the upper shell 30 which is fitted inside the lower shell 20 from above. In addition, the components of the magnetic disk cartridge 10 are all assembled while being stacked within the lower shell 20, except that the cover plate 41 is bonded on the circular recess 37 of the upper shell 30. Therefore, the magnetic disk cartridge 10 of the present invention has excellent assembly and disassembly characteristics, although it is extremely small in size.

(2) The housing 2 has a planar shape, which consists of an arc along the contour of the magnetic disk 14, and two tangential lines extending from the opposite ends of the arc and crossing each other at right angles. Therefore, when the housing 2 is inserted into the disk drive 6, the housing 2 can be reliably positioned in a predetermined direction with respect to the disk drive 6.

(3) The side walls 21, 22 of the right-angled corner of the housing 12 extend slightly outward from the circumferential wall 20b formed along the contour of the magnetic disk 14. In addition, the upper edges of the two side walls 21, 22 protrude upward from the plate portion of the housing 12. Therefore, if only the magnetic disk cartridge 10 is gripped by hand, the top and bottom surfaces of the magnetic disk cartridge 10 can be discriminated and the inserting direction with respect to the disk drive 6 can be easily recognized. In addition, because the shape of the cartridge-inserting slot 6a of the disk drive 6 corresponds to the projected shape of the side walls 21 and 22, incorrect insertion of the magnetic disk cartridge 10 can be prevented.

(4) The housing corner defined by the two side walls 21 and 22 is at a position remote from the circumference of the magnetic disk 14. As a result, the housing corner can be provided with the positioning reference aperture 16 which penetrates the housing 12 in the vertical direction, or the identification piece 18 capable of reading information by the reflection, transmission, or the transmission of a specific wavelength of light can also be buried in the housing 12 after assembly. In that case, recording capacity, etc., can be identified by the identification piece 18.

(5) The lower shutter 25 and the upper shutter 35 are constructed so that they are coupled together by press-fitting the upward flange portion 25c of the lower shutter 25 into the space between the engagement pieces 35c1 and 35c2 of the downward flange portion 35c of the upper shutter 35. Therefore, the upper shutter 35 can be coupled with the lower shutter 25 within the lower shell 20, after the upper shell 30 is fitted to the lower shell 20. Thus, it is extremely easy to assemble the shutters.

(6) When the lower shutter 25 is press-fitted in the upper shutter 35, the engagement tongue pieces 35f, 35f of the downward flange portion 35c of the upper shutter 35 are inserted into the cutouts 25d, 25d of the lower shutter 25. As a result, there is no possibility that the lower shutter 25 will be disengaged from the upper shutter 35.

(7) The magnetic disk cartridge can be easily recycled because the lower shell 20, upper shell 30, cover plate 41, and shutters 25, 35 are all formed from metal.

While the present invention has been described with reference to the preferred embodiments thereof, the invention is not to be limited to the details given herein, but may be modified within the scope of the invention hereinafter claimed.

What is claimed is:

1. A magnetic disk cartridge for use in a disk drive, comprising:

a housing in which a magnetic disk is rotatably housed, and which has upper and lower openings through which magnetic heads provided in said disk drive are positioned over both sides of said magnetic disk; and upper and lower shutters for exposing both sides of said magnetic disk through said upper and lower openings;

wherein said housing comprises a lower shell, and an upper shell which is fitted inside said lower shell from above, and said upper shutter is disposed outside said upper shell;

and wherein all components are assembled into said magnetic disk cartridge while being stacked within said lower shell.

2. The magnetic disk cartridge as set forth in claim 1, wherein:

said lower shutter is disposed inside said lower shell; and said upper shutter and lower shutter are coupled with each other in front of said upper and lower openings and rotatable as an integral unit.

3. The magnetic disk cartridge as set forth in claim 2, wherein said housing has an external shape which comprises an arc along the contour of said magnetic disk, and two tangential lines extending from the opposite ends of said arc and crossing each other at right angles.

4. The magnetic disk cartridge as set forth in claim 3, wherein:

said housing further comprises two side walls extending along said two tangential lines and crossing each other at right angles;

one of said two side walls is provided on the rear end of said housing in a direction perpendicular to the direction in which said magnetic disk cartridge is inserted into said disk drive, while the other of said two side walls is provided parallel to the inserting direction; and said housing has a corner which is formed by said two side walls.

5. The magnetic disk cartridge as set forth in claim 4, wherein at least one of, the exterior surfaces of said two side walls protrude slightly outward from tangential lines of a circumferential wall of said housing, and top edges of said two side walls protrude from an upper side of a top plate portion of said housing.

6. The magnetic disk cartridge as set forth in claim 5, wherein said magnetic disk comprises a magnetic recording medium with a high recording density employing barium ferrite power.

7. The magnetic disk cartridge as set forth in claim 1, wherein said magnetic disk comprises a magnetic recording medium with a high recording density employing barium ferrite powder.

8. A magnetic disk cartridge for use in a disk drive, comprising:
   a housing in which a magnetic disk is rotatably housed, and which has upper and lower openings through which magnetic heads provided in said disk drive are positioned over both sides of said magnetic disk; and
   a shutter for exposing both sides of said magnetic disk through said upper and lower openings;
   wherein said housing comprises a lower shell, and an upper shell which is fitted inside said lower shell from above;
   wherein said shutter comprises a lower shutter disposed inside said lower shell and an upper shutter disposed outside said upper shell;
   and wherein said lower shutter and said upper shutter are provided with engagement means so that they are coupled together by press fitting.

9. The magnetic disk cartridge as set forth in claim 8, wherein said lower shutter and said upper shutter are provided with disengagement prevention means for preventing said shutters from moving in a vertical direction after said shutters are coupled with each other.

10. The magnetic disk cartridge as set forth in claim 9, wherein:
   said lower shutter and said upper shutter are equipped with fan-shaped main plate portions for covering said openings and flange portions extending from the arcuate edges of said fan-shaped main plate portions, respectively; and
   said engagement means and said disengagement prevention means are provided in said flange portions.

11. The magnetic disk cartridge as set forth in claim 10, wherein said magnetic disk comprises a magnetic recording medium with a high recording density employing barium ferrite power.

12. The magnetic disk cartridge as set forth in claim 8, wherein said magnetic disk comprises a magnetic recording medium with a high recording density employing barium ferrite powder.

13. A magnetic disk cartridge for use in a disk drive, comprising:
   a housing in which a magnetic disk is rotatably housed, and which has upper and lower openings through which magnetic heads provided in said disk drive are positioned over both sides of said magnetic disk; and
   upper and lower shutters for exposing both sides of said magnetic disk through said upper and lower openings;
   wherein said housing comprises an upper metal shell which forms a top surface and a side surface of said housing, and a lower metal shell which forms a bottom surface and a side surface of said housing;
   and wherein the side surface of said upper shell and the side surface of said lower shell are coupled directly with each other.

14. The magnetic disk cartridge as set forth in claim 13, wherein said magnetic disk comprises a magnetic recording medium with a high recording density employing barium ferrite powder.

* * * * *